(12) United States Patent
Uchino et al.

(10) Patent No.: US 10,893,530 B2
(45) Date of Patent: *Jan. 12, 2021

(54) RADIO BASE STATION AND MOBILE STATION

(71) Applicant: NTT DOCOMO, INC., Tokyo (JP)

(72) Inventors: Tooru Uchino, Tokyo (JP); Hideaki Takahashi, Tokyo (JP); Akihito Hanaki, Tokyo (JP); Kenichiro Aoyagi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,251

(22) Filed: Nov. 1, 2017

(65) Prior Publication Data

US 2018/0054828 A1 Feb. 22, 2018

Related U.S. Application Data

(63) Continuation of application No. 14/781,067, filed as application No. PCT/JP2014/057791 on Mar. 20, 2014, now Pat. No. 9,839,044.

(30) Foreign Application Priority Data

Apr. 5, 2013 (JP) .................................. 2013-079796

(51) Int. Cl.
*H04W 72/10* (2009.01)
*H04W 28/16* (2009.01)
(Continued)

(52) U.S. Cl.
CPC ......... *H04W 72/10* (2013.01); *H04L 47/2433* (2013.01); *H04W 28/0263* (2013.01);
(Continued)

(58) Field of Classification Search
CPC . H04W 28/0263; H04W 28/10; H04W 28/16; H04W 72/10; H04W 76/10; H04W 76/15; H04W 80/02
See application file for complete search history.

(56) References Cited

U.S. PATENT DOCUMENTS 6,850,540 B1 * 2/2005 Peisa .................. H04L 12/5601
370/395.4
2009/0067326 A1 3/2009 Perrot et al.
(Continued)

FOREIGN PATENT DOCUMENTS

CN 102742321 A 10/2012
JP 2008-537657 A 9/2008
(Continued)

OTHER PUBLICATIONS

Office Action issued in corresponding European Application No. 14778144.7, dated Dec. 22, 2017 (7 pages).
(Continued)

*Primary Examiner* — Gregory B Sefcheck
*Assistant Examiner* — Debebe A Asefa
(74) *Attorney, Agent, or Firm* — Osha Bergman Watanabe & Burton LLP

(57) ABSTRACT

Priority control is performed using FPIs. A radio base station eNB according to the present invention includes: a bearer management unit 12 configured to manage FPIs assigned to data flows received from a core network device S-GW via an S1 bearer; and a priority control unit 13 configured to perform priority control over the data flows received from the core network device S-GW via the S1 bearer, in which the bearer management unit 12 establishes a radio bearer with a mobile station UE for each of the FPIs, and the priority control unit 13 transfers each data flow received from the core network device S-GW via the S1 bearer, to the
(Continued)

radio bearer corresponding to the FPI assigned to the data flow.

1 Claim, 7 Drawing Sheets

(51) Int. Cl.
    *H04W 80/02*     (2009.01)
    *H04W 28/02*     (2009.01)
    *H04W 28/10*     (2009.01)
    *H04L 12/851*     (2013.01)
    *H04W 76/10*     (2018.01)
    *H04W 76/15*     (2018.01)

(52) U.S. Cl.
    CPC ........... *H04W 28/10* (2013.01); *H04W 28/16* (2013.01); *H04W 76/10* (2018.02); *H04W 80/02* (2013.01); *H04W 76/15* (2018.02)

(56) References Cited

U.S. PATENT DOCUMENTS

| | | | |
|---|---|---|---|
| 2011/0317560 A1 | 12/2011 | Aramoto et al. | |
| 2012/0008501 A1* | 1/2012 | Lundh | H04W 28/22 370/235 |
| 2013/0176975 A1* | 7/2013 | Turanyi | H04W 28/16 370/329 |
| 2014/0328288 A1 | 11/2014 | Lu et al. | |
| 2015/0124748 A1 | 5/2015 | Park et al. | |
| 2015/0223095 A1 | 8/2015 | Centonza et al. | |
| 2016/0050682 A1* | 2/2016 | Uchino | H04W 28/16 370/235 |

FOREIGN PATENT DOCUMENTS

| | | | | |
|---|---|---|---|---|
| JP | 2010-511356 A | 4/2010 | | |
| JP | 2010-283792 A | 12/2010 | | |
| JP | 2012-23770 A | 2/2012 | | |
| WO | 2008/067358 A2 | 6/2008 | | |
| WO | 2010/079715 A1 | 7/2010 | | |
| WO | 2011/016174 A1 | 2/2011 | | |
| WO | WO 2013/125999 A * | 8/2013 | ........... H04L 12/865 370/235 | |
| WO | WO-2013125999 A1 * | 8/2013 | ......... H04L 47/6275 | |

OTHER PUBLICATIONS

International Search Report issued in corresponding application No. PCT/JP2014/057791 dated Jun. 24, 2014 (7 pages).
Written Opinion issued in corresponding applictaion No. PCT/JP2014/057791 dated Jun. 24, 2014 (8 pages).
3GPP TS 36.300 V11.5.0; "3rd Generation Partnership Project; Technical Specification Group Radio Access Network; Evolved Universal Terrestrial Radio Access (E-UTRA) and Evolved Universal Terrestrial Radio Access Network (E-TRAN); Overall description; Stage 2 (Release 11)", Mar. 2013 (209 pages).
Telecom Italia et al.; "Views on RAN User Plane congestion mitigation"; SA WG2 Meeting #95, S2-130060, Prague, Czech Republic; Jan. 28-Feb. 1, 2013 (6 pages).
Extended European Search Report issued in the counterpart European Patent Application No. 14778144.7, dated Sep. 30, 2016 (11 pages).
Nokia Siemens Networks, et al.; "Solution alternative enhancing existing QoS bearer concept"; SA WG2 Meeting #96, S2-131179; San Diego, USA; Apr. 8-12, 2013 (4 pages).
3GPP TR 23.705 V0.3.0; 3rd Generation Partnership Project; Technical Specification Group Services and System Aspects; System Enhancements for User Plane Congestion Management (Release 12); Apr. 2013 (18 pages).
Office Action issued in the counterpart Japanese Patent Application No. 2013-079796, dated May 9, 2017 (11 pages).

* cited by examiner

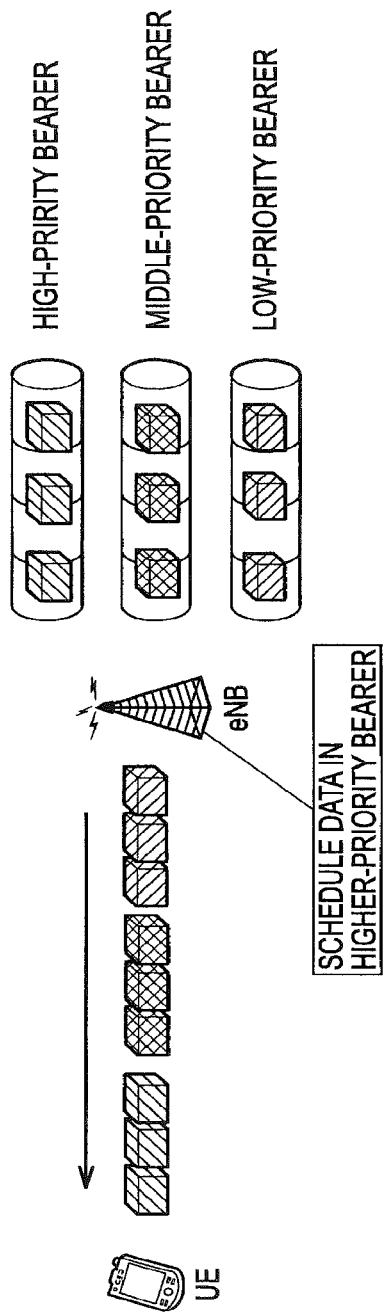

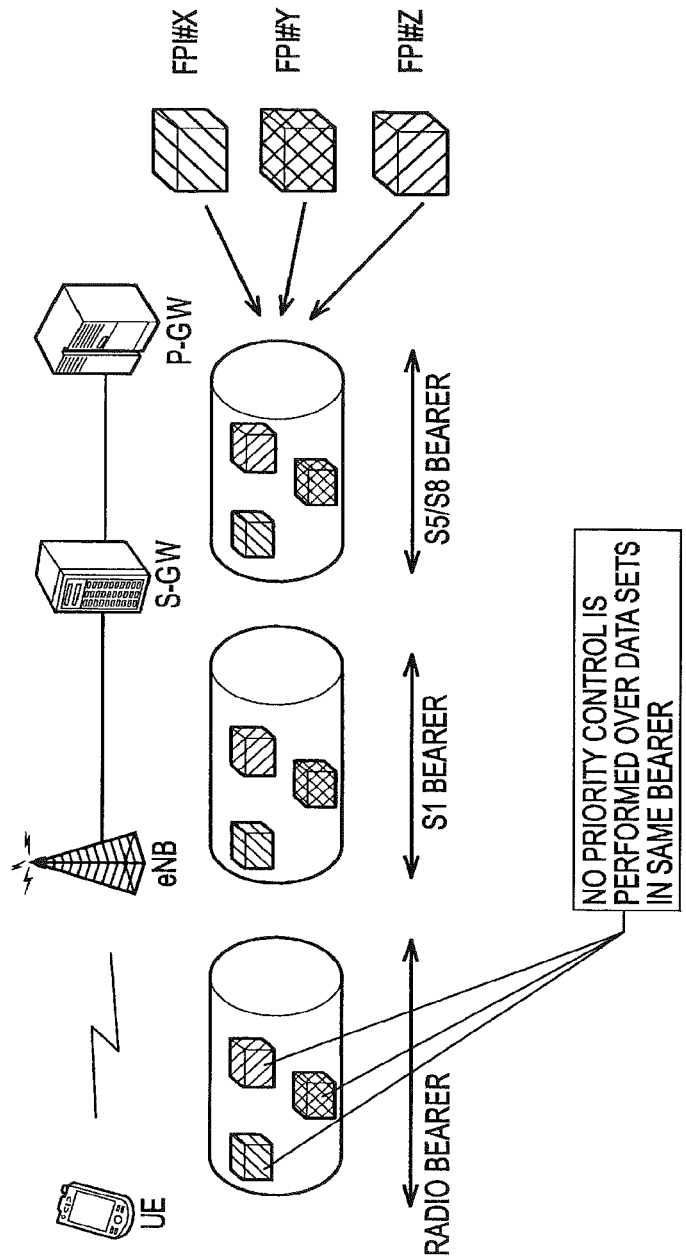

RADIO BASE STATION AND MOBILE STATION

CROSS-REFERENCE TO RELATED APPLICATIONS

This is a continuation application of U.S. patent application Ser. No. 14/781,067 filed Sep. 29, 2015, which is a national stage application of PCT/JP2014/057791, which claims priority to Japanese Patent Application No. 2013-079796. The contents of these applications are hereby incorporated by reference in their entirety.

TECHNICAL FIELD

The present invention relates to a radio base station and a mobile station.

BACKGROUND ART

In LTE (Long Term Evolution), priority control is performed in such a manner that a bearer (LCH: Logical Channel) is established for each QCI (QoS Class Identifier) and a priority (Logical Channel Priority) is assigned to each bearer.

Here, data sets in the same bearer are deemed to have the same priority. In addition, the priority control is performed both in a radio base station eNB and a mobile station UE.

Further, in LTE, the MAC layer is in charge of priority control in a radio access network. For example, as illustrated in FIG. 7, the MAC layer of a radio base station eNB is configured to decide the order of data sets to be transmitted to a radio bearer, based on priorities assigned to respective bearers.

Meanwhile, in LTE Release 12, a study on avoiding radio access network congestion due to U-plane signals is made in the "UPCON (U-Plane Congestion Management) WI (Working Item)."

Lately, services provided even on the same web browser are a mixture of texts, images, motion videos, streaming media, and the like.

Under the above circumstances, if radio access network congestion occurs, there is a demand to transmit streaming media, texts, images, motion videos in this order, for example.

In the present situation, in order to carry out QoS (Quality of Service) control, priority control over an EPS (Enhanced Packet System) bearer is performed using QCIs.

In addition to a QCI, the "UPCON WI" defines a "FPI (Flow Priority Indicator)" indicating the priority of each data flow (IP flow) for more detailed priority control, and discusses solving means for (a scheduler of) the radio base station eNB to carry out the QoS control and priority control using the FPI.

PRIOR ART DOCUMENT

Non-Patent Document

Non-patent document 1: 3GPP Contribution S2-130060

SUMMARY OF THE INVENTION

However, the configuration of a radio access network in the current LTE systems has a problem in that, because neither the radio base station eNB nor the mobile station UE takes into consideration of FPIs, priority control using FPIs cannot be performed as illustrated in FIG. 8.

The present invention has been therefore made in view of the above circumstances and an objective thereof is to provide a radio base station and a mobile station which can perform priority control using FPIs.

A first feature of the present invention is summarized as a radio base station including: a bearer management unit configured to manage flow priorities assigned to data flows received from a core network device via an S1 bearer; and a priority control unit configured to perform priority control over the data flows received from the core network device via the S1 bearer. Here, the bearer management unit establishes a radio bearer with a mobile station for each of the flow priorities, and the priority control unit transfers each data flow received from the core network device via the S1 bearer, to the radio bearer corresponding to the flow priority assigned to the data flow.

A second feature of the present invention is summarized as a mobile station including: a bearer management unit configured to manage flow priorities assigned to data flows to be transmitted to a radio base station via radio bearers; and a priority control unit configured to perform priority control over the data flows to be transmitted to the radio base station via the radio bearers. Here, the bearer management unit establishes a radio bearer with the radio base station for each of the flow priorities, and the priority control unit transfers each data flow to the radio bearer corresponding to the flow priority assigned to the data flow, the data flow being to be transmitted to the radio base station via the corresponding radio bearer.

A third feature of the present invention is summarized as a radio base station including a priority control unit configured to perform priority control in a PDCP layer over a data flow received from a core network device. Here, the priority control unit manages a flow priority assigned to the data flow received from the core network device and a priority in the PDCP layer in association with each other, and the priority control unit performs priority control over the data flow received from the core network device, based on the priority in the PDCP layer that is associated with the flow priority assigned to the data flow.

A fourth feature of the present invention is summarized as a mobile station including a priority control unit configured to perform priority control in a PDCP layer over a data flow to be transmitted to a radio base station. Here, the priority control unit performs priority control over the data flow to be transmitted to the radio base station, based on a priority in the PDCP layer that is associated with a flow priority assigned to the data flow.

A fifth feature of the present invention is summarized as a mobile station including a transmission unit configured to notify a radio base station eNB of a capability regarding a flow priority assigned to a data flow.

BRIEF DESCRIPTION OF THE DRAWINGS

FIG. 7 is a diagram for explaining conventional technology.

FIG. 8 is a diagram for explaining conventional technology.

DETAILED DESCRIPTION (Mobile Communication System According to First Embodiment of Present Invention)

A mobile communication system according to a first embodiment of the present invention is described with reference to FIGS. 1 to 4.

Figure 1:
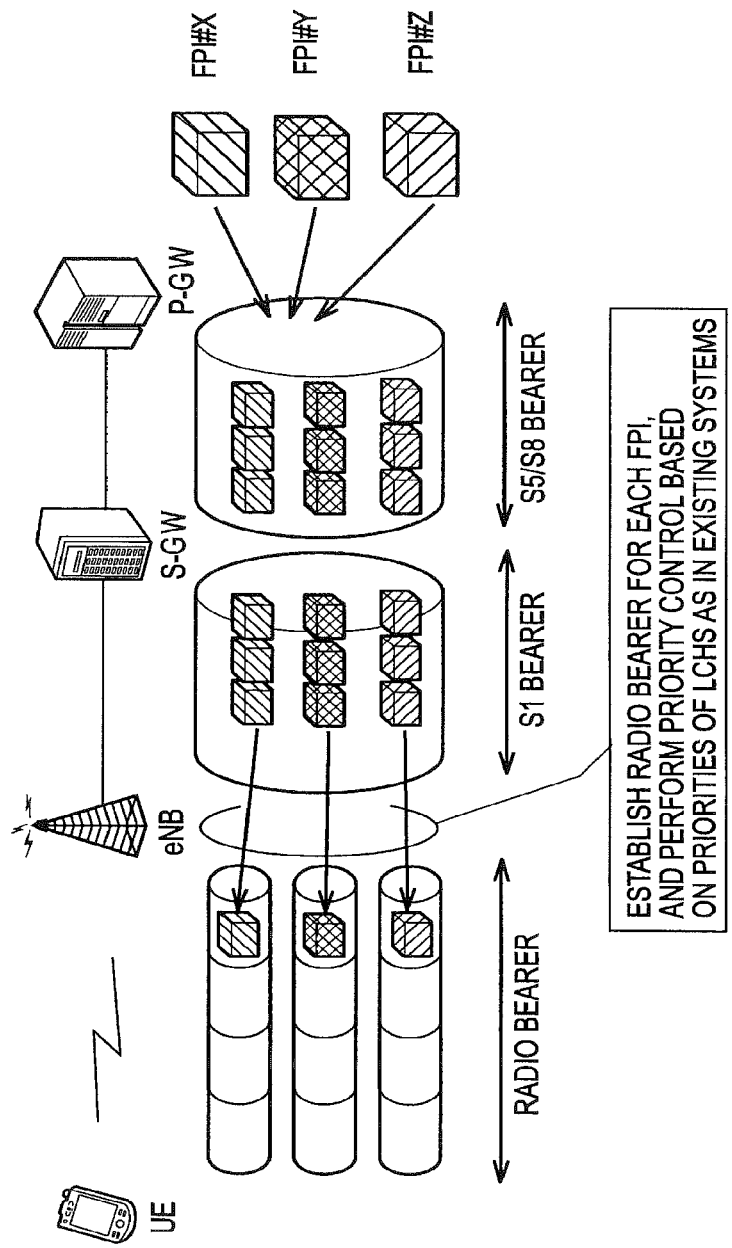
FIG. 1 is an overall configuration diagram of a mobile communication system according to a first embodiment of the present invention.

As illustrated in FIG. 1, the mobile communication system according to this embodiment includes a core network device P-GW, a core network device S-GW, a radio base station eNB, and a mobile station UE.

In the mobile communication system according to this embodiment, S1 bearers are established for respective QCIs, and radio bearers are respectively established for FPIs #X to #Z which are assigned to data flows that can be transmitted via the S1 bearer of the same QCI.

As illustrated in FIG. 1, in the mobile communication system according to this embodiment, each EPS bearer includes multiple radio bearers, one S1 bearer, and one S5/S8 bearer.

In addition, in the mobile communication system according to this embodiment, each E-RAB includes multiple radio bearers and one S1 bearer.

Here, each radio bearer is established between the mobile station UE and the radio base station eNB, each S1 bearer is established between the radio base station eNB and the core network device S-GW, and each S5/S8 bearer is established between the core network device S-GW and the core network device P-GW.

Figure 2:
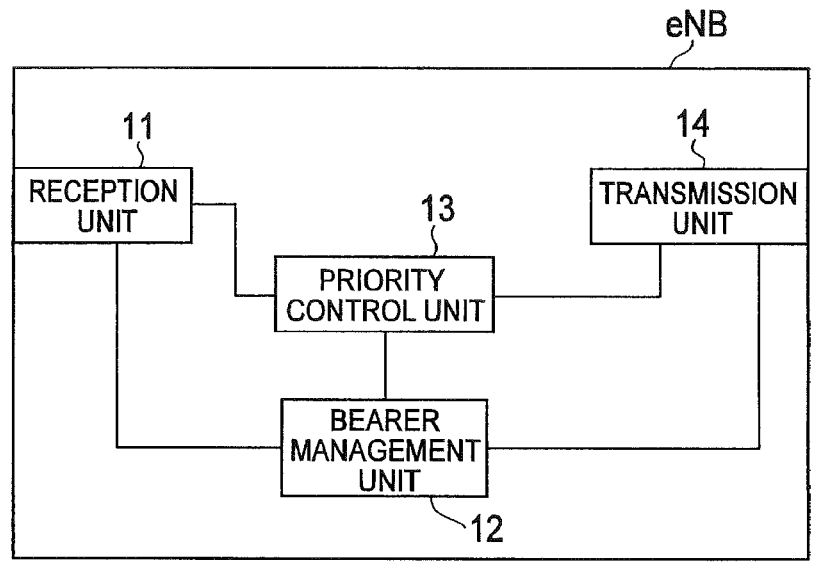
FIG. 2 is a functional block diagram of a radio base station eNB according to the first embodiment of the present invention.

As illustrated in FIG. 2, the radio base station eNB according to this embodiment includes a reception unit 11, a bearer management unit 12, a priority control unit 13, and a transmission unit 14.

The reception unit 11 is configured to receive various signals from the mobile station UE and the core network device S-GW.

The bearer management unit 12 is configured to manage the radio bearers and S1 bearers described above.

For example, the bearer management unit 12 manages QCIs that are assigned to respective S1 bearers and FPIs that are assigned to respective data flows received from the core network device S-GW via each S1 bearer.

The bearer management unit 12 also establishes S1 bearers for respective QCIs with the core network device S-GW and establishes one or more radio bearers for respective FPIs with the mobile station UE.

The priority control unit 13 is configured to perform priority control over data flows received from the core network device S-GW via an S1 bearer.

For example, the priority control unit 13 transfers data flows received from the core network device S-GW via an S1 bearer, to radio bearers for the FPIs assigned to the data flows.

The transmission unit 14 is configured to transmit various signals to the mobile station UE and the core network device S-GW.

For example, the transmission unit 14 sends the mobile station UE data flows transferred by the priority control unit 13 via radio bearers.

Figure 3:
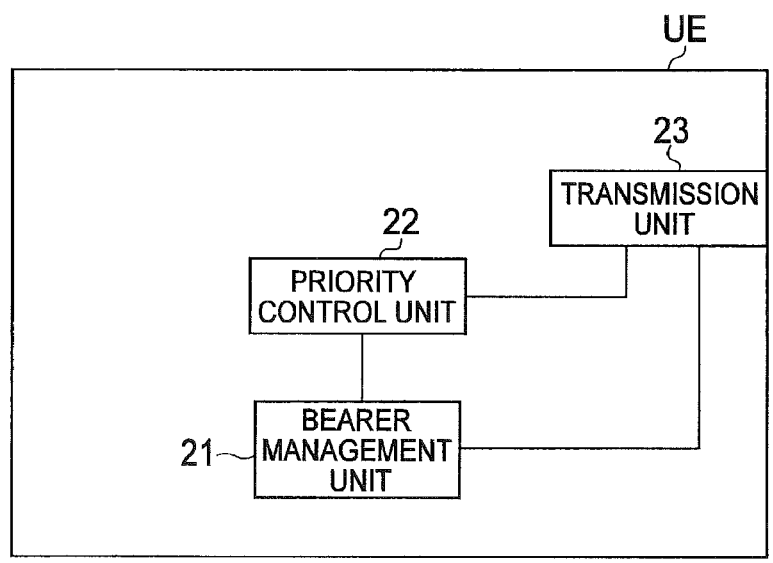
FIG. 3 is a functional block diagram of a mobile station UE according to the first embodiment of the present invention.

As illustrated in FIG. 3, the mobile station UE according to this embodiment includes a bearer management unit 21, a priority control unit 22, and a transmission unit 23.

The bearer management unit 21 is configured to manage the radio bearers described above.

For example, the bearer management unit 21 manages FPIs that are assigned to data flows to be transmitted to the radio base station eNB via the respective radio bearers.

The bearer management unit 21 also establishes radio bearers for respective FPIs with the radio base station eNB.

The priority control unit 22 is configured to perform priority control over data flows to be transmitted to the radio base station eNB via respective radio bearers.

For example, the priority control unit 22 transfers data flows to be transmitted to the radio base station eNB via radio bearers, to radio bearers for the FPIs assigned to the data flows.

The transmission unit 23 is configured to transmit various signals to the radio base station eNB and the core network device S-GW.

For example, the transmission unit 23 sends the radio base station eNB data flows transferred by the priority control unit 22 via radio bearers.

Hereinbelow, an operation of the mobile communication system according to this embodiment is described with reference to FIG. 4.

Figure 4:
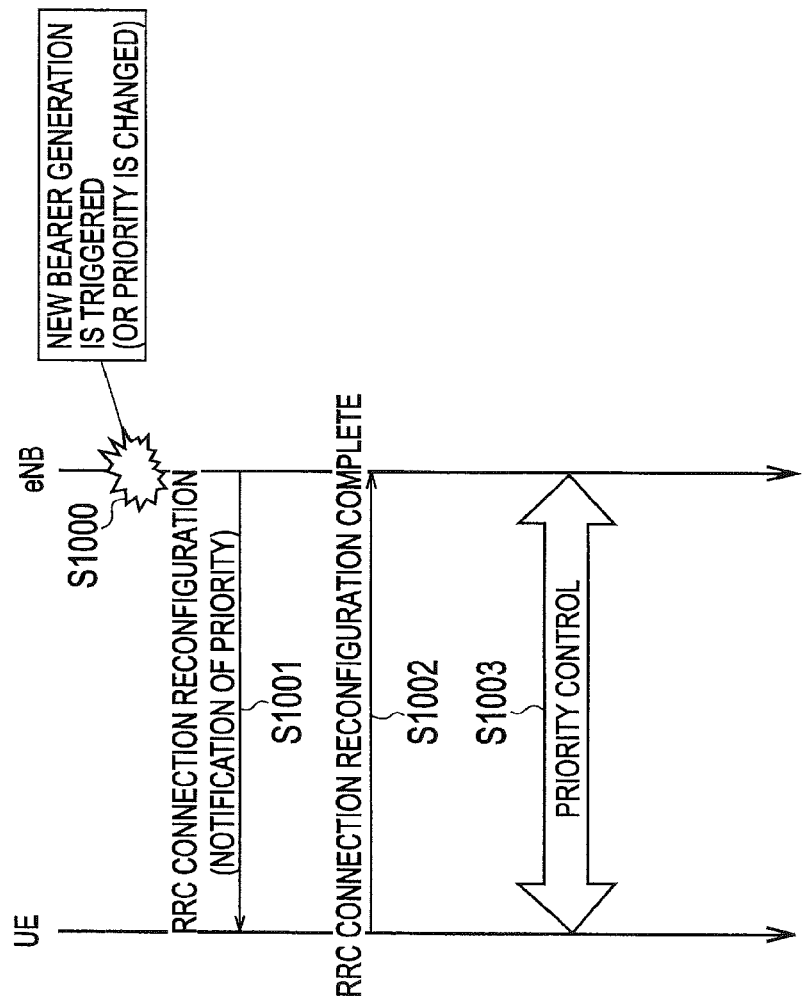
FIG. 4 is a sequence diagram for explaining an operation of the mobile communication system according to the first embodiment of the present invention.

As illustrated in FIG. 4, upon detecting a new radio bearer establishment trigger (or a change of FPI for an existing radio bearer) in Step S1000, the radio base station eNB sends the mobile station UE a "RRC connection reconfiguration" for notification of the FPI in Step S1001.

The mobile station UE establishes a radio bearer for the FPI (or changes the FPI for the existing radio bearer) in response to the "RRC connection reconfiguration," and sends the radio base station eNB a "RRC connection reconfiguration complete" in Step S1002.

Then, in Step S1003, the radio base station eNB and the mobile station UE perform priority control using the FPI.

(Mobile Communication System According to Second Embodiment of Present Invention)

Hereinbelow, with reference to FIGS. 5 and 6, a mobile communication system according to a second embodiment of the present invention is described in terms of differences from the mobile communication system according to the first embodiment described above.

In the mobile communication system according to this embodiment, S1 bearers and radio bearers are established for respective QCIs as in the bearer configuration of existing mobile communication systems.

In the radio base station eNB according to this embodiment, the priority control unit 13 is configured to manage "FPIs" in association with "DFPs (Data Flow Priorities)." Here, the "FPIs" are notified in "GTP-u headers" from a core network (mobile management node MME).

The priority control unit 13 is also configured to perform priority control in the PDCP layer over data flows received from the core network device S-GW.

Figure 5:
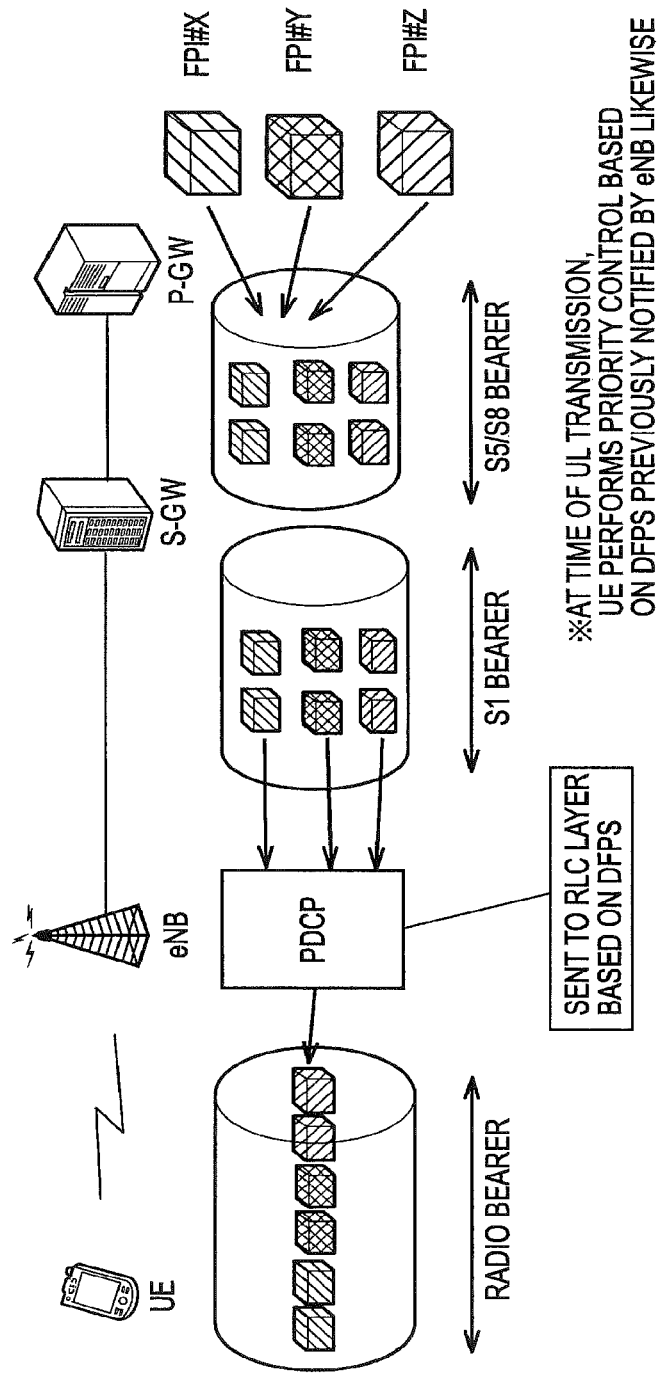
FIG. 5 is an overall configuration diagram of a mobile communication system according to a second embodiment of the present invention.

For example, as illustrated in FIG. 5, the priority control unit 13 performs priority control over data flows received from the core network device, based on DFPs associated with FPIs #X to #Z assigned to the data flows.

Specifically, suppose that a data flow given a smaller DFP value is assigned a higher priority, the priority control unit 13 preferentially transmits a data flow given a smaller DFP value to the RLC (Radio Link Control) layer (or transforms it into a PDCP-PDU) in the PDCP layer.

Note that the priority control unit 13 may perform priority control over data flows assigned no FPIs, based on default DFPs.

Here, the priority control unit 13 also performs priority control using existing QCIs in the MAC layer.

In addition, in the radio base station eNB according to this embodiment, the transmission unit 14 may be configured to notify the mobile station UE of information associating FPIs with DFPs.

Further, in the mobile station UE according to this embodiment, the priority control unit 22 is configured to perform priority control in the PDCP layer over data flows to be transmitted to the radio base station eNB.

For example, the priority control unit 22 performs priority control over data flows to be transmitted to the radio base station eNB, based on DFPs associated with FPIs #X to #Z assigned to the data flows.

Note that the priority control unit 22 may perform priority control over data flows assigned no FPIs, based on default DFPs.

Hereinbelow, operations of the radio base station eNB and the mobile station UE according to this embodiment are described with reference to FIG. 6.

Figure 6:
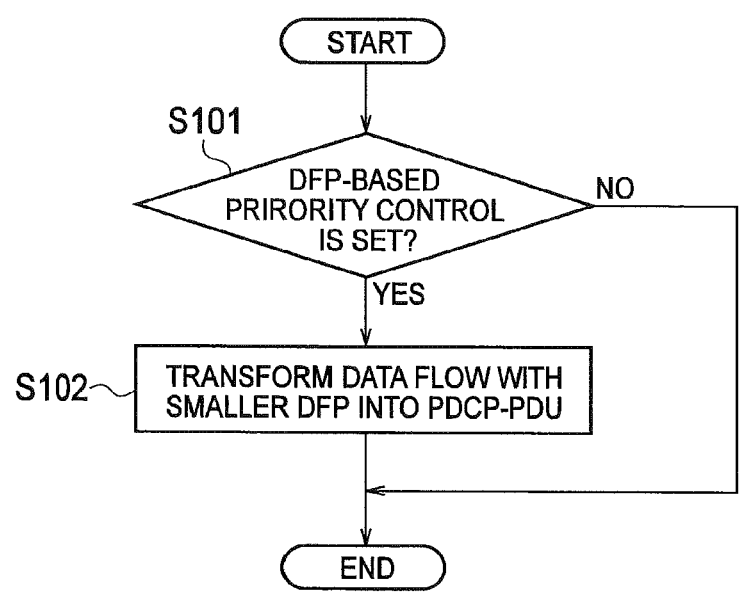
FIG. 6 is a flowchart for explaining operations of a radio base station and a mobile station according to the second embodiment of the present invention.

As illustrated in FIG. 6, the radio base station eNB and the mobile station UE judge whether or not the setting according to DFP-based priority control is made, i.e., whether or not DFPs for respective FPIs are set.

If "YES," the operation advances to Step S102. If "NO," the operation is terminated.

In Step S102, the radio base station eNB and the mobile station UE perform priority control in the PDCP layer over data flows to be transmitted, based on DFPs associated with FPIs #X to #Z assigned to the data flows.

For example, the radio base station eNB and the mobile station UE preferentially transmits a data flow given a smaller DFP value to the RLC layer (or transforms it into a PDCP-PDU) in the PDCP layer.

Note that, while the PDCP layer is provided with a discard timer for each bearer and data is discarded if its buffering time exceeds a predetermined period, a discard timer may be prepared for each FPI in addition to that timer. This enables data to be discarded based on more detailed priorities.

MODIFIED EXAMPLE

It is assumed that how many DFPs can be set in the mobile communication system according to the second embodiment described above depends on the capabilities of the mobile station UE.

For example, the mobile station UE which can be equipped with only a small amount of memory is assumed to have restrictions on the number of DFPs that the UE can set simultaneously.

If the number of DFPs set exceeds the capabilities of the mobile station UE, the normal operation of the mobile station UE cannot be guaranteed.

Thus, in the mobile station UE according to the second embodiment, the transmission unit 23 is configured to notify the radio base station eNB of the UE's capabilities regarding DFPs.

For example, the transmission unit 23 may use a "UE Capability" to provide notification of the capabilities regarding DFPs.

Here, as the capabilities regarding DFPs, the transmission unit 23 may provide notification of the number of DFPs settable in the mobile station UE, or the number of DFPs settable for each radio bearer.

For example, the radio base station eNB may be configured to decide the maximum number of DFPs to be set in each radio bearer according to the capabilities regarding DFPs. In this case, the radio base station eNB transmits the maximum number thus decided to the mobile station UE, so that the mobile station UE can perform appropriate memory management.

The features of the present embodiment may also be expressed as follows.

A first feature of the present embodiment is summarized as a radio base station eNB including: a bearer management unit 12 configured to manage FPIs (flow priorities) assigned to data flows received from a core network device S-GW via an S1 bearer; and a priority control unit 13 configured to perform priority control over the data flows received from the core network device S-GW via the S1 bearer. Here, the bearer management unit 12 establishes a radio bearer with a mobile station UE for each of the FPIs, and the priority control unit 13 transfers each data flow received from the core network device S-GW via the S1 bearer, to the radio bearer corresponding to the FPI assigned to the data flow.

According to the above aspect, the radio base station eNB transfers data flows received from the core network device S-GW via an S1 bearer to radio bearers for the FPIs assigned to the data flows, so that priority control using FPIs can be realized.

A second feature of the present embodiment is summarized as a mobile station UE including: a bearer management unit 21 configured to manage FPIs assigned to data flows to be transmitted to a radio base station eNB via radio bearers; and a priority control unit 22 configured to perform priority control over the data flows to be transmitted to the radio base station eNB via the radio bearers. Here, the bearer management unit 21 establishes a radio bearer with the radio base station eNB for each of the FPIs, and the priority control unit 22 transfers each data flow to the radio bearer corresponding to the FPI assigned to the data flow, the data flow being to be transmitted to the radio base station eNB via the corresponding radio bearer.

According to the above aspect, the mobile station UE transfers data flows to be transmitted to the radio base station eNB via radio bearers to radio bearers for the FPIs assigned to the data flows, so that priority control using FPIs can be realized.

A third feature of the present embodiment is summarized as a radio base station eNB including a priority control unit 13 configured to perform priority control in a PDCP layer over a data flow received from a core network device S-GW. Here, the priority control unit 13 manages a FPI and a DFP (priority in the PDCP layer) in association with each other, and the priority control unit 13 performs priority control over the data flow received from the core network device, based on the DFP that is associated with the FPI assigned to the data flow.

According to the above aspect, the radio base station eNB performs priority control in the PDCP layer based on DFPs corresponding to FPIs, so that priority control using FPIs can be realized.

In the third feature of the present embodiment, the priority control unit 13 may perform priority control over a data flow not assigned the FPI, based on a default DFP (predefined priority in the PDCP layer).

According to the above aspect, the radio base station eNB can perform priority control appropriately also over data flows assigned no FPIs.

In the third feature of the present embodiment, the radio base station eNB may further include a transmission unit 14 configured to notify a mobile station UE of information associating the FPI and the DFP with each other.

According to the above aspect, it is possible to avoid a situation where the mapping of FPIs to DFPs varies between the mobile station UE and the radio base station eNB.

A fourth feature of the present embodiment is summarized as a mobile station UE including a priority control unit 22 configured to perform priority control in a PDCP layer over a data flow to be transmitted to a radio base station eNB. Here, the priority control unit 22 performs priority control over the data flow to be transmitted to the radio base station eNB, based on a DFP that is associated with a FPI assigned to the data flow.

According to the above aspect, the mobile station UE performs priority control in the PDCP layer based on DFPs corresponding to FPIs, so that priority control using FPIs can be realized.

In the fourth feature of the present embodiment, the priority control unit 22 may perform priority control over a data flow not assigned the FPI, based on a default DFP.

According to the above aspect, the mobile station UE can perform priority control appropriately also over data flows assigned no FPIs.

A fifth feature of the present embodiment is summarized as a mobile station UE including a transmission unit 23 configured to notify a radio base station eNB of a capability regarding DFP (capability regarding a FPI assigned to a data flow).

In the fifth feature of the present embodiment, the capability regarding the FPI may indicate any one of the number of DFPs settable in a mobile station UE and the number of DFPs settable for each radio bearer.

It should be noted that the foregoing operations of the mobile stations UE, the radio base station eNB, and the core network devices S-GW/P-GW may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE, the radio base station eNB, and the core network devices S-GW/P-GW. Otherwise, the storage medium and the processor may be provided as discrete components inside the mobile stations UE, the radio base station eNB, and the core network devices S-GW/P-GW.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-079796 (filed on Apr. 5, 2013) is incorporated by reference in the present specification.

INDUSTRIAL APPLICABILITY

As has been described so far, the present invention can provide a radio base station and a mobile station which can perform priority control using FPIs.

EXPLANATION OF THE REFERENCE NUMERALS eNB radio base station
UE mobile station
11 reception unit
12, 21 bearer management unit
13, 22 priority control unit
14, 23 transmission unit

The invention claimed is:
1. A mobile station comprising:
a processor that manages flow priorities assigned to data flows to be transmitted to a radio base station via radio bearers;
wherein:
the processor performs priority control based on priorities assigned in relation to Flow Priority Indicators (FPIs) and Quality of Service Class Identifiers (QCIs), FPI indicating a flow priority of each data flow, and QCI indicating a class of Quality of Service,
the processor performs priority control over the data flows to be transmitted to the radio base station via the radio bearers,
the processor establishes a radio bearer with the radio base station for each of the flow priorities, and
the processor transfers each data flow to the radio bearer corresponding to the flow priority assigned to the data flow; and
a transmitter that transmits the data flow to the radio base station via the corresponding radio bearer,
wherein each of the flow priorities has a respective discard timer for discarding data in the corresponding data flow if a buffering time of the data exceeds a predetermined period.

* * * * *